(12) United States Patent
Hughes et al.

(10) Patent No.: US 12,737,995 B2
(45) Date of Patent: Sep. 15, 2026

(54) PET SUPPLY SIMULATIONS USING AUGMENTED REALITY

(71) Applicant: TOSHIBA GLOBAL COMMERCE SOLUTIONS, INC., Durham, NC (US)

(72) Inventors: Kevin C. Hughes, Cary, NC (US); Philip S. Brown, Cary, NC (US); Evgeny Shevtsov, Plano, TX (US); Leon T. Cain, II, Cary, NC (US)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 135 days.

(21) Appl. No.: 18/402,586

(22) Filed: Jan. 2, 2024

(65) Prior Publication Data

US 2025/0218132 A1 Jul. 3, 2025

(51) Int. Cl.

| | |
|---|---|
| ***G06T 19/00*** | (2011.01) |
| ***G06F 40/20*** | (2020.01) |
| ***G06T 11/00*** | (2006.01) |
| ***G06V 10/40*** | (2022.01) |
| ***G06V 10/82*** | (2022.01) |
| ***G06V 20/20*** | (2022.01) |

(52) U.S. Cl.

CPC ............ *G06T 19/006* (2013.01); *G06F 40/20* (2020.01); *G06T 11/00* (2013.01); *G06V 10/40* (2022.01); *G06V 10/82* (2022.01); *G06V 20/20* (2022.01)

(58) Field of Classification Search

None

See application file for complete search history.

(56) References Cited

U.S. PATENT DOCUMENTS 11,961,198 B2 * 4/2024 Dhana ........................ G06T 7/55
2012/0306919 A1 * 12/2012 Suzuki ................ G06V 40/103 345/633
2014/0168217 A1 * 6/2014 Kim .................. G06Q 30/0643 345/420

(Continued)

OTHER PUBLICATIONS https://auglio.com/en/?utm_source=google&utm_medium=gs&utm_campaign=USA&ppc_keyword=virtual%20try-on% 20technology &gclid=Cj0KCQjw5f2IBhCkARIsAHe TvlhRGTi2KO6OkzJS7Hza1CLINTpTvUV3ArQE_ P3uxEv5wqoWHAi go3AaApiKEALw_wcB.

(Continued)

*Primary Examiner* — David H Chu

(74) *Attorney, Agent, or Firm* — Patterson + Sheridan, LLP; Gero G. McClellan

(57) ABSTRACT

Methods and techniques for generating a composite visual representation that integrates visual data of a pet with potential purchased items are provided. Visual data of a pet is received. Features of the pet are extracted by analyzing the visual data. A first mapping for the pet is generated based on the extracted features using one or more computer vision algorithms. Measurement data of a pet-related item selected by a user is collected. A second mapping for the pet-related item is generated based on the measurement data. A third mapping that corresponds to one or more dimensional differences between the pet in the first mapping and the pet-related item in the second mapping is generated. A composite mapping is created by combining the first, second and third mappings. The composite mapping is displayed in an augmented reality environment.

18 Claims, 8 Drawing Sheets

(56) References Cited

U.S. PATENT DOCUMENTS

| | | | | |
|---|---|---|---|---|
| 2014/0176565 | A1* | 6/2014 | Adeyoola | G06Q 30/0643 345/473 |
| 2015/0062301 | A1* | 3/2015 | Lin | A61B 5/1079 348/46 |
| 2017/0039775 | A1* | 2/2017 | Applegate | G06T 7/30 |
| 2018/0061141 | A1* | 3/2018 | Choi | G06F 30/00 |
| 2018/0350010 | A1* | 12/2018 | Kuper | G06N 20/00 |
| 2021/0049817 | A1* | 2/2021 | Lee | G06F 3/011 |
| 2022/0044070 | A1* | 2/2022 | Koh | G06N 3/08 |
| 2022/0253923 | A1* | 8/2022 | Donnelly | G06Q 30/0643 |
| 2022/0351378 | A1* | 11/2022 | Kamiyama | G06V 10/255 |
| 2024/0177388 | A1* | 5/2024 | Johl | G06Q 30/0631 |
| 2024/0177628 | A1* | 5/2024 | Han | G09B 23/28 |
| 2024/0362877 | A1* | 10/2024 | Aparajeya | G06T 19/20 |
| 2024/0394870 | A1* | 11/2024 | Planche | G06T 7/11 |
| 2025/0086359 | A1* | 3/2025 | Seong | G06N 3/08 |

OTHER PUBLICATIONS https://wanna.fashion/.

https://www.vitronic.com/en-US/3d-bodyscan/body-scan-for-made-tomeasure# :~: text=VITUS%20BODYSCAN% 20generates%20data%20with, be%20reproduced%20at%20any%20time.

https://kitradar.com/blogs/startups/3d-scan-your-body-with-a-phone-a-shift-in-buying-sports-clothing.

* cited by examiner

PET SUPPLY SIMULATIONS USING AUGMENTED REALITY

BACKGROUND

With the rapid expansion of the pet care supply market, pet owners face new challenges when making purchase decisions. Conventionally, pet owners select pet supplies based on general size guidelines or suggestions (e.g., size, weight). While these physical attributes offer some guidance, they fail to provide a direct representation of how a product will fit a specific pet. While pet owners might consider photos of similar-looking pets using the product as a reference, such images often only offer a general impression and do not provide a high level of confidence about the suitability of a product for their pets. This uncertainty not only leads to increased product returns that cause frustration for pet owners, but also incurs additional operational and logistical costs for suppliers. Furthermore, the constant need to replace pet supplies due to a pet's growth further increases the overall cost of pet ownership.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially used in other embodiments without recitation.

DETAILED DESCRIPTION

The present disclosure relates to augmented reality, and more specifically, to generating a composite visual representation that integrate visual data of a pet with potential purchased items.

Embodiments of the present disclosure provide methods and techniques to generate visual representations depicting compatibility between a pet and related products. In some embodiments, the disclosed techniques include creating individual mappings for pets and selected pet-related items, generating one or more difference mappings that capture the dimensional differences between the pets and selected items of interest, and combining the individual mappings and difference mappings to produce composite mappings.

In some embodiments, the composite mappings provide direct visual representations of how the pet might interact with or fit into the selected items. As used herein, pet-related items may refer to a broad range of products used by pets, such as toys, beds, clothing, carriers, and accessories, among others. In some embodiments, the system may receive data about a pet from an end user device, and then process the data to extract relevant features (e.g., weight, height, activity level) of the pet. Based on the extracted features, the pet mapping may be generated using one or more trained mapping generation models. In some embodiments, by processing the extracted pet features, the system may predict the pet's growth over a designated timeframe using one or more advanced algorithms. The predicted outputs may then be provided to generate a pet mapping that reflects the anticipated pet growth. As used herein, "data" for the pet may include a variety of information types. For example, the data may include textual data, such as the pet's breed, age, color, gender, weight, and height, and visual data, such as images, videos, or other graphic representations that capture the pet's appearance, posture, living environment, and/or other relevant physical and behavioral characteristics.

In some embodiments, such as when multiple pet-related items are selected, the system may collect measurement data and generate an item mapping for each selected item. In some embodiments, the composite mappings may include two-dimensional (2D) or three-dimensional (3D) representations that illustrate the potential interactions between the pet and the selected items. In some embodiments, the composite mappings may be displayed in an augmented reality (AR) environment, to provide end users or customers with a near-realistic view of the product's usability and/or suitability.

Figure 1:
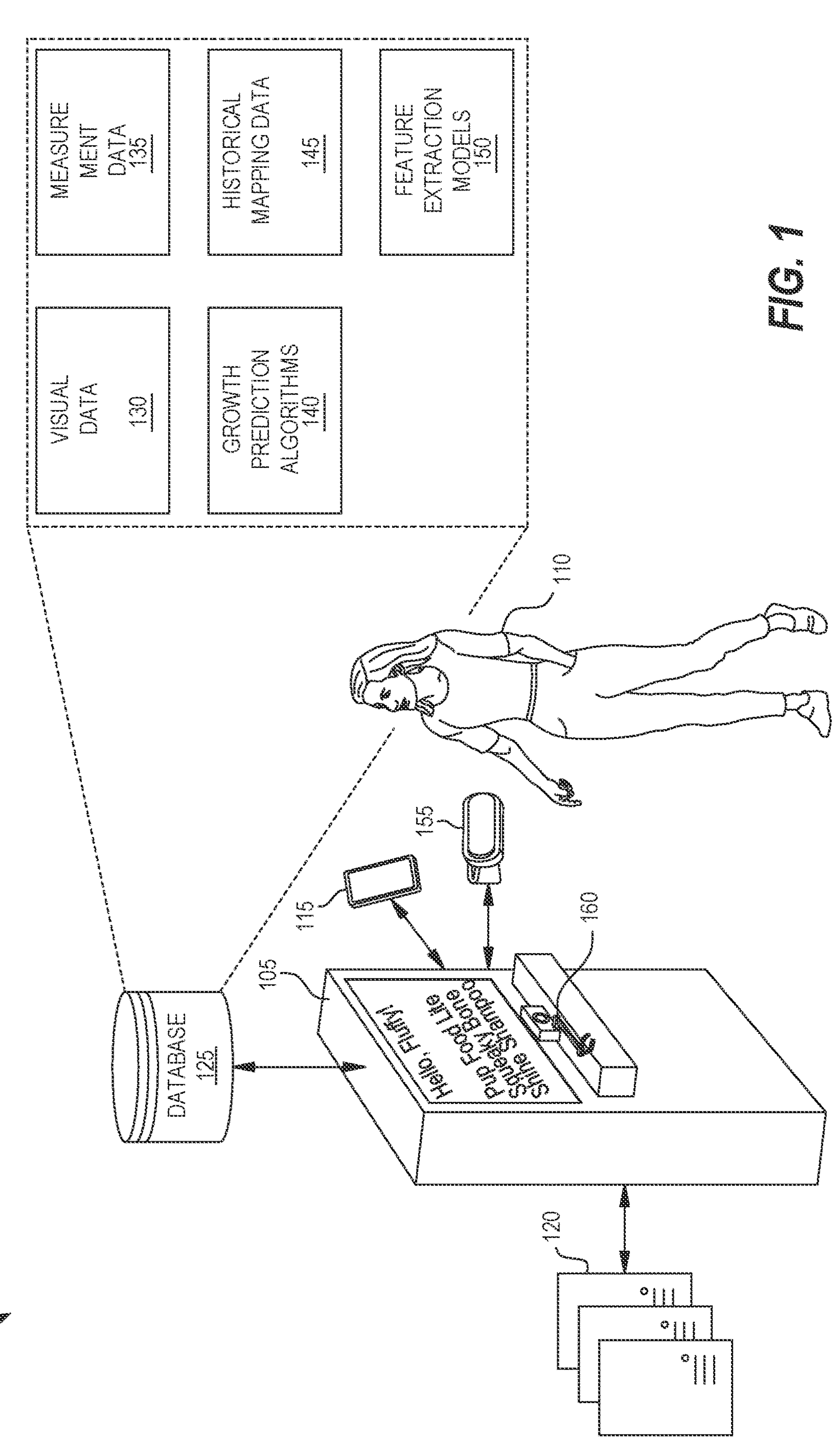
FIG. 1 depicts an example environment in which embodiments of the present disclosure may be implemented.

FIG. 1 depicts an example environment 100 in which embodiments of the present disclosure may be implemented. In the illustrated example, the environment 100 includes a check-in kiosk 105. The check-in kiosk 105 is communicatively coupled with one or more end user devices 115, one or more servers 120, one or more AR headsets 155, a database 125, and a built-in camera device 160. In some embodiments, one or more of the illustrated devices may be a physical device or system. In other embodiments, one or more of the illustrated devices may be implemented using virtual devices, and/or across a number of devices.

The check-in kiosk 105 generally corresponds to a computing device in a physical enterprise, such as a retail environment, that allows users to check-in or access various data. For example, in some embodiments, end users or customers 110 may type in the detail information about their pets, including but not limited to descriptive statements about the pet (e.g., color, breed) and metrics related to the pet (e.g., weight, height, length), into the system via the check-in kiosk 105. In some embodiments, in addition to or as an alternative to textual data, the check-in kiosk 105 may be equipped with a built-in camera 160, which allows users to directly scan the visual data of their pets, such as images, videos, or other media files, into the system. Upon receiving the visual data, the check-in kiosk 105 may transmit it to the one or more servers 120 for further processing and analysis. In addition to or instead of scanning the pet images via the check-in kiosk 105, several other transmission methods may be used, such as Bluetooth, Wi-Fi Direct, near field communication (NFC), or wired connections like USB-C ports.

The check-in kiosk 105 may further streamline the shopping experience by allowing end users 110 to input or choose pet-related products they are interested in purchasing. For example, in some embodiments, the check-in kiosk 105 may display a list of available pet-related items in a store. When the users 110 intend to buy a product (e.g., a pet carrier), they may type in this preference into the check-in kiosk 105, or scan the item (e.g., scan a barcode of the item) via the check-in kiosk 105. The check-in kiosk 105, upon receiving the input, may generate a list of matching or similar items. In some embodiments, the check-in kiosk 105 may use audio recognition algorithms to detect the users' preferred or selected products based on their verbal requests or instructions.

In some embodiments, the check-in kiosk 105, the one or more user end devices 115, the one or more servers 120, the one or more AR headsets 155, the database 125, and the built-in camera device 160 may be remote from each other and communicatively coupled to each other via a network. The network may include or correspond to a wide area network (WAN), a local area network (LAN), the Internet, an intranet, or any combination of suitable communication mediums that may be available, and may include wired, wireless, or a combination of wired and wireless links. In some embodiments, the check-in kiosk 105, the one or more user end devices 115, the one or more servers 120, the one or more AR headsets 155, the database 125, and the built-in camera device 160 may be local to each other (e.g., within the same local network and/or the same hardware system), and communicate with one another using any appropriate local communication medium, such as a local area network (LAN) (including a wireless local area network (WLAN)), hardwire, wireless link, or intranet, etc.

In the illustrated example, the server(s) 120 function as the central processing unit(s) that coordinate multiple tasks to provide the desired AR representations for the end users or customers 110. As discussed above, in some embodiments, the end users or customers 110 may input basic information about their pets (e.g., color, age, breed, weight, height) to the server 120 via the check-in kiosk 105. In some embodiments, such as when a pet's visual data (e.g., images or videos) is available on the user's personal device (e.g., a smartphone) (e.g., 115 of FIG. 1), the user may provide information about the pet by scanning the visual data (e.g., images or videos) displayed on his devices using the built-in camera 160 of the check-in kiosk 105. In some embodiments, the check-in kiosk 105 may directly receive visual data (e.g., images or videos) of the pet from the user's device through either wired (e.g., USB-C) or wireless connections (e.g., Bluetooth, NFC, Wi-Fi Direct), and transmit the data to the server(s) 120 for further processing and analysis. In some embodiments, the visual data may include media files in various formats, including but not limited to images, videos, motion graphics, or other media formats that offer a visual representation of a pet. The visual data may depict various features or attributes of the pet, such as its physical attributes (e.g., weight, color, breed, height, age), behavioral patterns (e.g., running, jumping, resting), and anatomical gestures and/or movements (e.g., anatomical gestures that are common to the breed of the pet, and those that are unique to a pet). In some embodiments, the end user devices 115 may correspond to conventional computing devices, such as laptops, desktops, tablets, smart phones, IoT devices, and the like. In some embodiments, the end user devices 115 may include a CPU, a memory, a storage, one or more network interfaces, and one or more I/O interfaces, where the CPU may retrieve and execute programming instructions stored in the memory, as well as store and retrieve application data residing in the storage.

In some embodiments, the server(s) 120 may generate pet mappings based on the received visual data. In some embodiments, by processing the visual data (e.g., images, videos) for a pet, the server(s) 120 may apply trained ML models (such as convolutional neural networks) (e.g., 150 saved in database 125) to extract relevant pet features. Based on the extracted pet features, the server(s) 120 may then generate an accurate mapping for the pet.

In some embodiments, the server(s) 120 may further predict the pet's growth within a defined timeframe (e.g., three months, a year). To achieve this, the server(s) 120 may apply the extracted pet features (along with the corresponding parameters or values) to the established growth prediction algorithms (e.g., 140 saved in database 125). The outputs of the algorithms may include a range of predicted physical attributes, including but not limited to the pet's future weight, height, appearance, and breed-related traits or behaviors. Based on the predicted outputs, the server(s) 120 may generate a mapping for the pet that depicts its anticipated growth within the defined timeframe.

In some embodiments, the server(s) 120 may receive visual data for one or more pets from a customer or end user 110. In such configurations, the received visual data 130 and its generated pet mappings (e.g., historical mapping data 145) may be stored in the database 125, and directly linked to the end user's profile.

In some embodiments, end users or customers 110 may inform the server(s) 120 about their selected pet-related items using the check-in kiosk 105. After receiving the notification, the server(s) 120 may access the database 125 to retrieve the relevant measurement data (e.g., dimensions, size, weight, material, or other relevant specifications) for these items.

In some embodiments, by processing the retrieved measurement data, the server(s) 120 may extract features for each selected item, and create a corresponding item mapping. In some embodiments, the item mappings for the selected items may be stored in the database 125 (e.g., historical mapping data 145) for future use.

In some embodiments, after a pet mapping (representing a user's pet) and an item mapping (for the item selected by the user) have been generated, the server(s) 120 may compare the two mappings to produce a difference mapping. The difference mapping may highlight or indicate the dimensional or scale differences between the pet and the item. In some embodiments, the difference mapping may serve as a comparative layer and demonstrate the discrepancies in size and/or proportion between the pet and the selected item. In some embodiments, when multiple items are selected for one pet, a difference mapping may be generated for each item by comparing the pet mapping with the respective item mapping. This approach may ensure that each product's fit and suitability are individually assessed against the pet's dimensions.

In some embodiments, the server(s) 120 may integrate the pet mappings, the item mappings, and their corresponding difference mappings to produce one or more composite mappings. As discussed above, in some embodiments, a difference mapping may highlight the discrepancies in size, proportion, and/or orientation between a pet and a selected item. Using the identified discrepancies, the server(s) 120 may refine or update the visual representation of either the selected item or the pet (or both), to ensure they align proportionally when superimposed into a composite mapping.

In some embodiments, such as when several items are selected for a single pet, several composite mappings may be generated, each corresponding to a item-pet combination. Each of these composite mappings may illustrate how the pet might interact with an individual selected item. Alternatively, in other embodiments, the server(s) 120 may consolidate the pet mapping with all the item mappings to produce a unified composite mapping. The single and unified composite mapping may provide a visual representation of the pet's potential interactions with all the selected items.

In some embodiments, the composite mappings may be in 2D or 3D formats, depending on the system's capabilities and user preferences. In some embodiments, the server(s) 120 may directly display the composite mappings in an AR environment, to provide end users or customers with a realistic view of the potential interactions between the pet and the selected items. In some embodiments, the server(s) 120 may transmit these composite mappings to one or more devices, such as the AR headsets 155 and/or the user device 115, which display the composite mappings to the end users 110.

Figure 2:
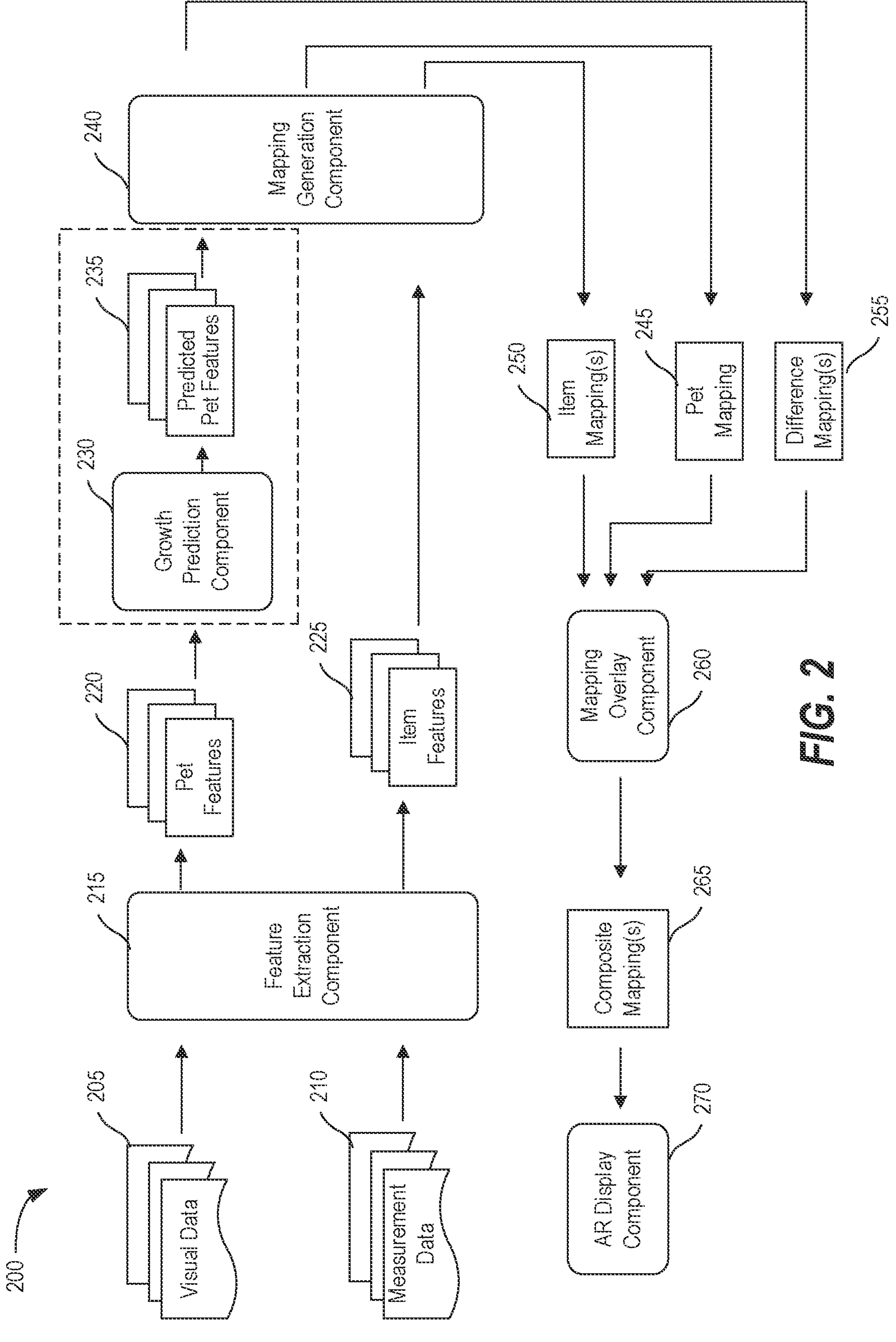
FIG. 2 depicts an example of workflow for generating composite visual representations for pets and selected items, according to some embodiments of the present disclosure.
Figure 8:
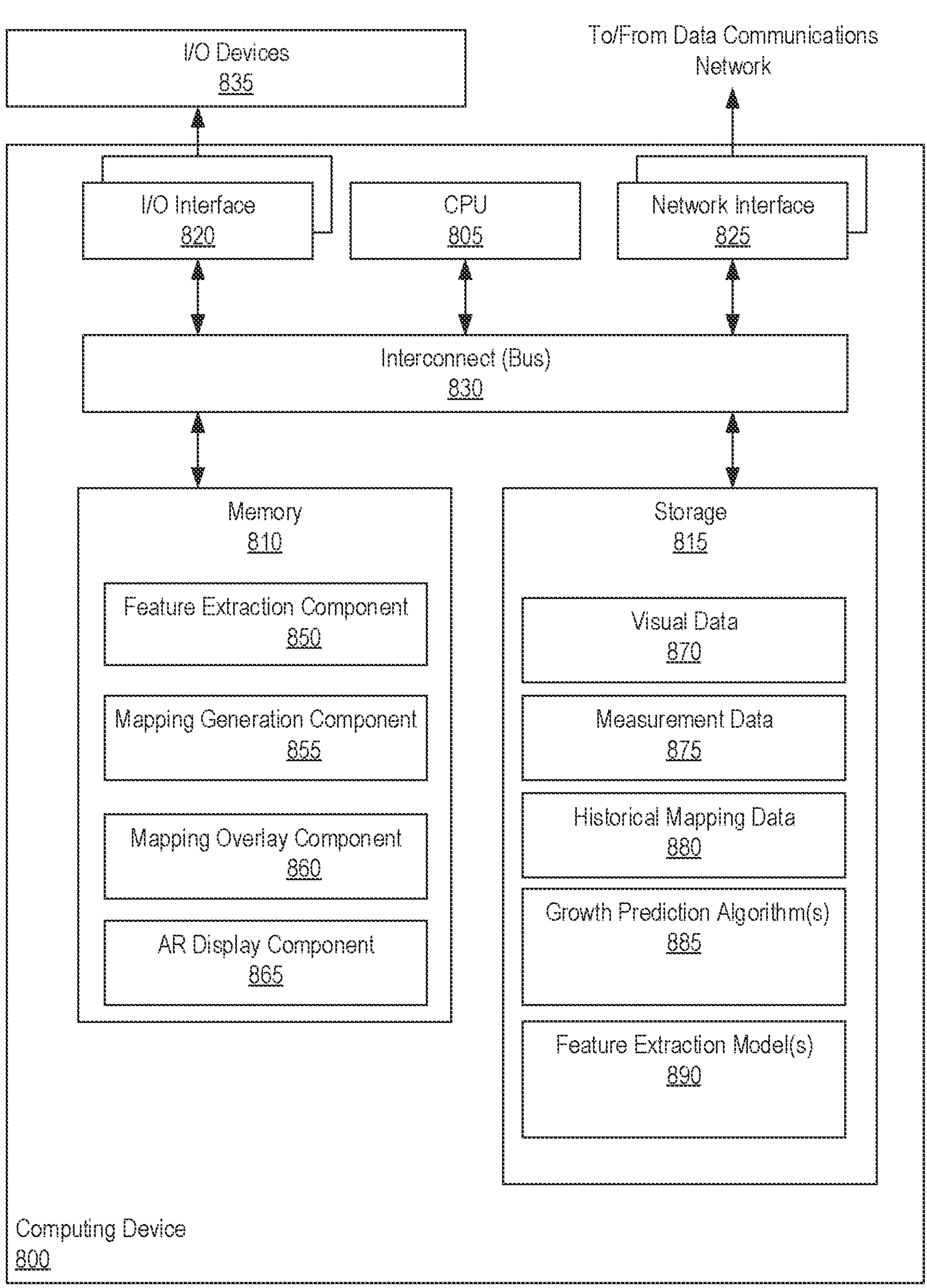
FIG. 8 depicts an example computing device for mapping generation and composition, according to some embodiments of the present disclosure.

FIG. 2 depicts an example of workflow 200 for generating composite visual representations for pets and selected items, according to some embodiments of the present disclosure. In some embodiments, the workflow 200 may be performed by one or more computing systems, such as the server 101 as illustrated in FIG. 1, and/or the computing device 800 as illustrated in FIG. 8.

In the illustrated example, the visual data 205 (e.g., videos, images) is provided to a feature extraction component 215. In some embodiments, the visual data 205 may capture the appearance and movements of a pet. As discussed above, the visual data may be uploaded by a user or customer through his personal device (e.g., 115 of FIG. 1) or scanned by a check-in kiosk (e.g., 105 of FIG. 1). In some embodiments, in addition to providing visual data, or as an alternative of providing visual data, textual data about the pet may be provided to the feature extraction component 215. The textual data may include various details about the pet, such as breed, age, gender, color, weight, height, or other relevant physical and behavioral attributes. The textual data may be processed by the feature extraction component 215 to identify features of the pet, and may contribute to the generation of a pet mapping.

In the illustrated example, the feature extraction component 215 extracts features of the pet by processing the received visual data 205. In some embodiments, the feature extraction component 215 may pre-process the visual data 205 (e.g., by reducing noise or increasing contrast), and divide the visual data 205 into regions that separate the pet from the background or other objects. The pre-processing and segmentation may improve the efficiency and accuracy of feature extraction. In some embodiments, after the pre-processing and segmentation are complete, the feature extraction component 215 may apply trained machine learning (ML) models to process the data and extract relevant features 220 for creating a mapping of the pet. In some embodiments, the ML models may include convolutional neural networks that are trained to identify and extract features of an object (e.g., a pet or a pet-related item) from its associated visual data (e.g., images, videos). The extracted features 220 may represent the distinctive characteristics of the pet as illustrated in the visual data 205, including but not limited to the pet's physical attributes (e.g., color, weight, height, texture of fur or skin), its behavioral patterns (e.g., jumping, resting, eating), and its activity level (e.g., anatomical movements and/or gestures that are commonly seen across the breed of the pet or those that are unique to the individual pet). In some embodiments, the feature extraction component 215 may identify the breed of the pet based on the extracted features 220.

In the illustrated example, the extracted pet features 220 are provided to a growth prediction component 230, which predicts the pet's growth over a defined timeframe (e.g., one year). The predicted growth may include changes in the physical attributes (e.g., color, weight, height) of the pet and/or its behavioral tendencies (e.g., increased rest periods in older pets). In some embodiments, the growth prediction component 230 may use advanced algorithms to make growth predictions. In some embodiments, the advanced algorithms may include ML models (e.g., regression models, convolutional neural networks) trained on historical datasets that capture the growth patterns of various animals and breeds. By processing the current extracted features 220 (along with the corresponding values) as inputs, the growth prediction component 230 may generate a set of predicted features 235 using the trained ML models. In some embodiments, these predicted features 235 may reflect the pet's future growth, including but not limited to changes in size, appearance, behavioral patterns, and activity levels.

In the illustrated example, the predicted pet features 235 are transmitted to a mapping generation component 240, which creates a detailed mapping 245 of the pet that reflects its anticipated growth within a defined period of time (e.g., three months). In some embodiments, the current pet features 220 may be directly provided to the mapping generation component 240. Under such configurations, the output mapping 245 may represent the pet in its current status, capturing details such as the pet's current size, appearance, behaviors, and/or activity levels.

In the illustrated example, measurement data 210 is provided to the feature extraction component 215. In some embodiments, the measurement data 210 may include the characteristics of one or more pet-related items selected by an end user (e.g., 110 of FIG. 1). In some embodiments, the measurement data may be retrieved from a remote database (e.g., 125 of FIG. 1). By processing the measurement data, the feature extraction component 215 may deploy trained ML models to extract features 225 for each selected item. After the extraction is complete, the item features 225 may then be transmitted to the mapping generation component 240, which creates detailed mapping(s) 250 for these selected pet-related item(s) using one or more computer vision algorithms. In some embodiments, the generated individual mappings (e.g., item mapping(s) 250 and pet mappings 245) may include visual representations in 2D or 3D formats. For example, the pet mapping 245 may provide a 2D image or 3D model of the pet in its current state and/or anticipated future state. The item mapping(s) 250 may include 2D images or 3D models of the selected pet-related items, with each mapping corresponding to a selected item.

In the illustrated example, after the pet mapping and the item mapping(s) 250 have been generated, the mapping generation component 240 may compare the pet mapping with each item mapping to evaluate the item's fit and suitability in relation to the pet's dimensions. For each item, a corresponding difference mapping 255 is created. The difference mapping 255 may highlight the discrepancies in size and/or proportion between the pet and the selected pet-related item. More detail is discussed below with reference to FIG. 3.

In the illustrated example, the pet mapping 245, the item mapping(s) 250, and the difference mapping(s) 255 are provided to a mapping overlay component 260, which is configured to combine the three types of individual mappings to produce one or more composite mappings 265. In some embodiments, the mapping overlay component 260 may superimpose an item mapping (which represents a selected item like a collar) onto a pet mapping that captures the pet in its current status (e.g., a 3-month ragdoll cat). The sizes and/or proportion of the item (e.g., the collar) may be adjusted based on the discrepancies delineated in the difference mapping, and the resulting composite mapping 265 may represent how the pet might interact with or fit into the selected item (e.g., how the 3-month-old cat might look wearing the collar). In some embodiments, the mapping overlay component 260 may combine an item mapping (which depicts a selected item, such as a larger collar) with a pet mapping that depicts the pet in its anticipated future status (e.g., a 3-month ragdoll cat growing to 1 year old). Adjustments to the item's size and/or proportions may be made based on the highlighted discrepancies from the difference mapping. The resulting composite mapping 265 may offer a predictive visualization that depicts how the maturing pet might look or fit into the selected item (e.g., revealing the fit and comfort of the larger collar on the ragdoll cat as it grows to 1 year old).

In some embodiments, for example, when multiple items are selected for a single pet, the mapping overlay component 260 may integrate multiple item mappings 250 and their related difference mappings 255 into a singular pet mapping 245. The resulting composite mapping 265 may provide an integrated visual representation that enables customers to view the pet's compatibility with multiple items simultaneously.

In the illustrated example, the composite mapping(s) 265 are provided to an AR display component 270. In some embodiments, the composite mapping(s) 265 integrate the visual data of both the pet and the selected items. The composite mapping(s) 265 include interactive visual representations in 2D or 3D form. The AR display component 270 may be any AR device that is configured to display the composite mappings in an immersive AR environment, such as AR headsets, AR glasses, or other specialized AR viewing tools. Through the AR display component 270, customers or end users may observe how their pets might look while interacting with, using, or wearing the selected items. Based on these observations, customers may make informed purchasing decisions regarding the selected items.

Figure 3:
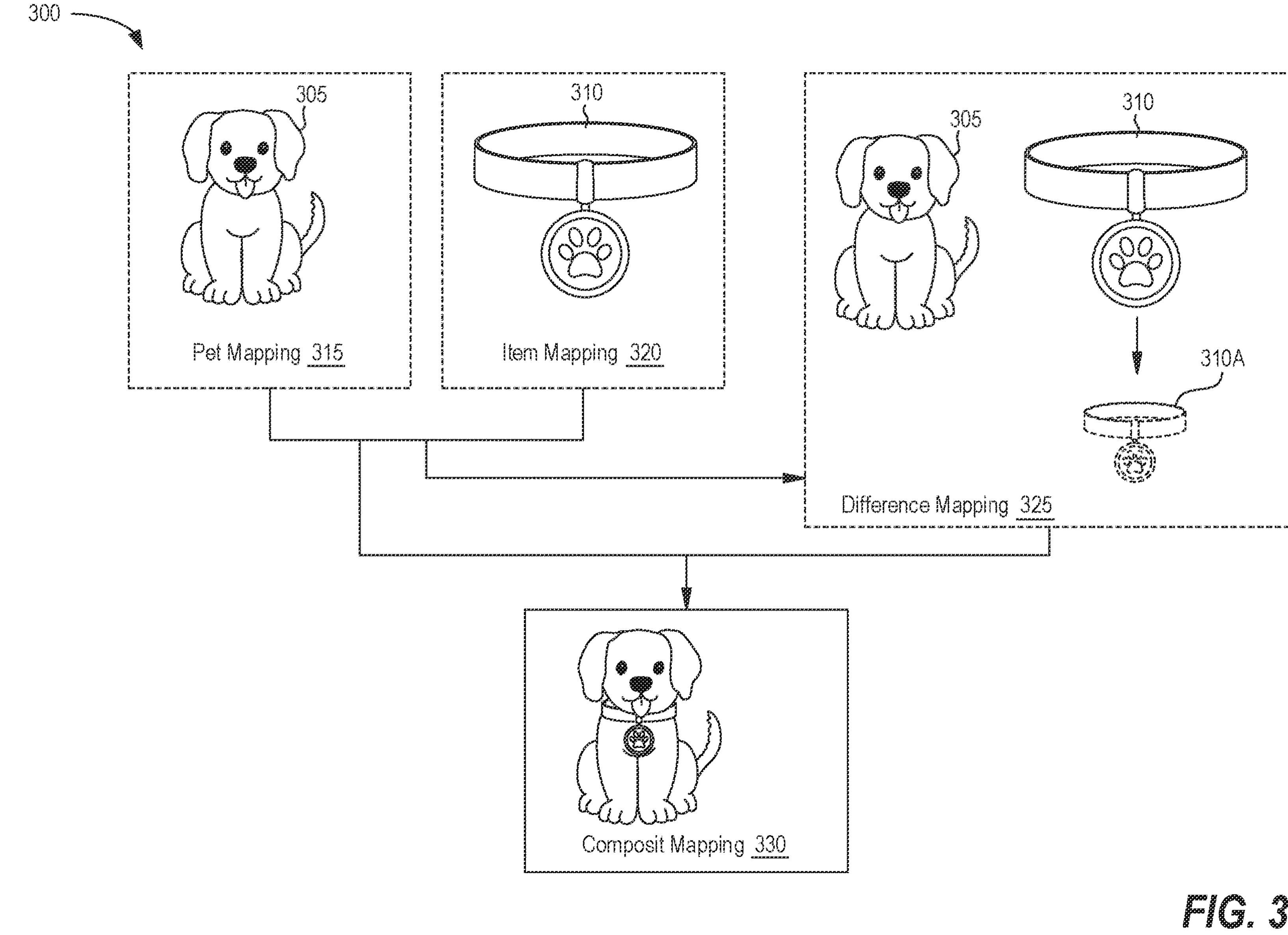
FIG. 3 depicts an example of composite mapping illustrating a dog wearing a collar selected by a user, according to some embodiments of the present disclosure.

FIG. 3 depicts an example of composite mapping illustrating a dog wearing a collar selected by a user, according to some embodiments of the present disclosure.

As illustrated, the pet mapping 315 represents a dog 305 in a size extracted from the visual data. The item mapping 320 represents a pet collar 310 in a size identified from its related measurement data (e.g., 210 of FIG. 2). In some embodiments, the item mapping 320 and the pet mapping 315 may operate on different scales. In the illustrated example, the discrepancy in scaling leads to a situation where the collar 310 in the item mapping appears disproportionally larger than the dog 305 in the pet mapping. If the item mapping 320 is directly overlaid onto the pet mapping 315 without addressing the discrepancies in scaling, the resulting composite mapping may be distorted, with the collar 310 appearing unrealistically larger than the dog.

To ensure an accurate visualization, a difference mapping 325 may be generated to capture the dimensional differences between the dog 305 in the pet mapping 315 and the collar 310 in the item mapping 320. As illustrated, within the difference mapping 325, the dog's representation 305 remains unchanged, and the collar 310 is adjusted from its original size to an updated size where the scale is unified. The updated collar representation 310A properly aligns with the dog representation 305. The pet mapping 315, the item mapping 320, and the difference mapping 325 are then integrated to produce a composite mapping 330. The composite mapping 330 provides a visualization that accurately depicts how the dog might appear when wearing the collar. By viewing the composite mapping 330 in an AR environment, users may obtain accurate and realistic insights into the fit and/or compatibility between the dog and the collar, aiding them in making informed purchase decisions.

Figure 4:
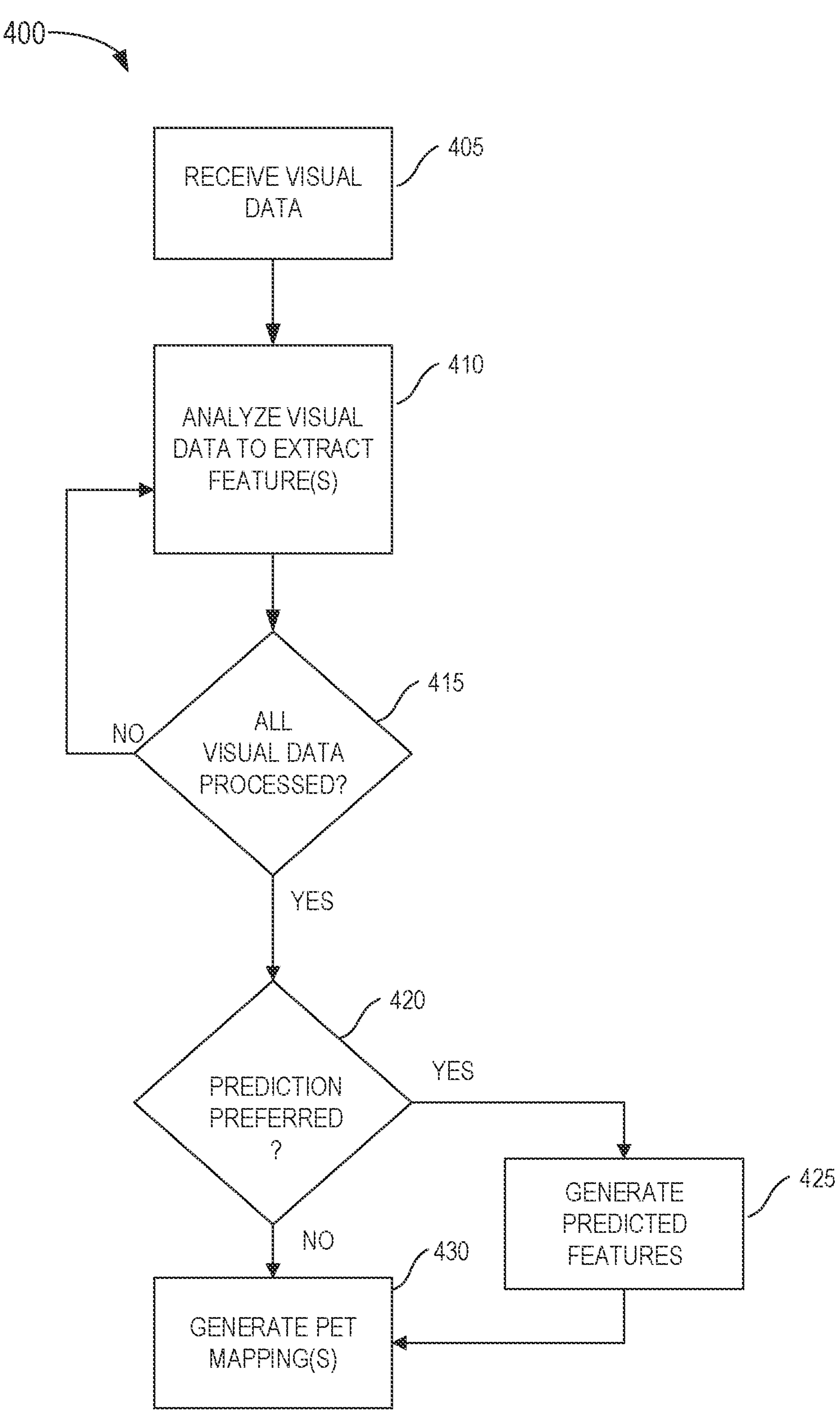
FIG. 4 depicts an example method for pet mapping generation, according to some embodiments of the present disclosure.

FIG. 4 depicts an example method 400 for pet mapping generation, according to some embodiments of the present disclosure. In some embodiments, the method 300 may be performed by one or more computing devices (e.g., a system that processes visual data and performs inventory searches), such as the server 120 as illustrated in FIG. 1, the feature extraction component 215 and/or the mapping generation component 240 as illustrated in FIG. 2, and the computing device 800 as illustrated in FIG. 8.

The method 400 begins at block 405, where a computing system (e.g., 120 of FIG. 1) receives visual data (e.g., images, videos) of a pet from an end user or customer (e.g., 110 of FIG. 1). In some embodiments, the visual data may include images, videos, and other visual representations that depict various aspects of the pet, such as its physical appearance, behavior, activity level, and other interactions with its environment. In some embodiments, In some embodiments, such as when the visual data of the pet is available on the user's personal devices (e.g., smart phones, tablets, laptops) (e.g., 115 of FIG. 1), the customer or end user may use the built-in camera (e.g., 160 of FIG. 1) within the check-in kiosk (e.g., 105 of FIG. 1) to scan and capture images or videos of the pet displayed on his devices. In some embodiments, the user may transmit the visual data (e.g., images or videos) directly from his devices (e.g., 115 of FIG. 1) to the system via wireless or wired connections, such as Wi-Fi Direct, Bluetooth, or NFC, among others. In some embodiments, besides providing visual data or as an alternative to providing visual data (especially when such visual data is not available), textual data about the pet may be provided by the user via the check-in kiosk (e.g., 105 of FIG. 1), either by manually typing in or through audio inputs.

At block 410, the computing system analyzes the visual data (e.g., images, videos) received from the user. In some embodiments, the computing system may apply trained ML models and computer vision techniques to examine the images or videos in order to extract and identify distinct features of the pet. In some embodiments, the system may identify the pet's physical attributes, including but not limited to its weight, height, color, texture of its fur or skin, and the like. The system may also recognize the pet's breed based on these physical attributes. In some embodiments, the system may extract the pet's behavioral patterns, such as the pet's jumping, resting, and eating poses. In some embodiments, the feature extraction may further include identifying the activity level of the pet, such as distinguishing between anatomical gestures or movements that are common across the breed of the pet and those that are unique to the individual pet. In some embodiments, before feature extraction, the system may preprocess visual data (e.g., images, videos) by reducing noise and/or enhancing contrast. In some embodiments, the system may segment the pet from its background and other objects. The preprocessing and segmentation may improve the efficiency and accuracy of the subsequent feature extraction. In some embodiments, the ML models may include convolutional neural networks (CNNs) that are trained to identify and extract features of an object (e.g., a pet or a pet-related item) from its associated visual data. In some embodiments, the CNNs may be trained using large amounts of datasets where features of the pets are identified and labeled. For example, the CNNs may be trained using images or videos of various breeds of pets as inputs, and the corresponding breed labels, physical attributes, and/or behavioral patterns as target outputs. Through extensive training and optimization processes, the CNNs may learn to establish correlations between the visual patterns in the images or videos and the corresponding labels and attributes. When another image or video of a pet is provided into the system, the CNN may efficiently identify the pet's breed, physical attributes, behavioral patterns, activity levels, and other relevant features in order to create an accurate mapping of the pet.

In some embodiments, such as when the visual data received for a pet also includes audio or textual descriptions, the computing system may incorporate audio recognition and natural language processing (NLP) techniques to further enhance the feature extraction process. For example, in some embodiments, the received visual data may include a video that has sounds (like pet vocalizations) that indicate moods, health status, or requirements of the pet. The system may capture these sounds, compared with a vast database of labeled pet sounds, and determine relevant physical or behavioral attributes of the pet. In some embodiments, the visual data (e.g., images, videos) may include textual descriptions that provide direct knowledge about the pet. For example, an image of a pet may include embedded text that reads "celebrating the third birthday for Max," or a video where the background voice mentions that "a lovely 3-month-old ragdoll is enjoying her new bed." These embedded texts and audio within the visual data, along with the textual data entered by the user (either by manually typing in or through audio inputs), may provide valuable context and information about the pet. In such configurations, the computing system may utilize text recognition and/or audio transcription techniques to process the images and videos and identify relevant pet features (e.g., breed, age, behavioral patterns).

At block 415, the computing system determines whether the received visual data (e.g., images, videos) for the pet has been fully processed so that the relevant features of the pet have been extracted. If the computing system identifies any visual data (e.g., an image) that has not been processed, the method 300 returns to block 410, where the computing system continues the analysis and extraction of relevant features from the unprocessed visual data. If the computing system determines that all received visual data for the pet has been processed, the method 400 proceeds to block 420.

At block 420, the computing system evaluates the preference for performing growth predictions for the pet based on the extracted features and/or a customer's input. For example, in some embodiments, a customer may notify the system that a selected item (e.g., clothing) is intended for her pet (which is currently 3 months old) when it grows to 1 year old. Based on the input, the system may determine that a prediction of the pet's growth over the next 9 months is preferred. In some embodiments, the computing system may recognize, without a customer's input, that the pet is young and in its growth stage. Based on the recognition, the system may determine that such growth predictions are preferred to ensure the pet mapping remains accurate and relevant for a long period of time. If the computing system determines that growth predictions are not preferred (e.g., due to the pet being of mature age or the customer indicating no prediction needed), the method 300 proceeds directly to block 430, where the computing system generates a mapping of the pet based on its current features and parameters using one or more computer vision algorithms (e.g., CNNs, 3D reconstruction, texture mapping). The pet mapping is an accurate representation of the pet in its present state without any predictive adjustments.

If the computing system determines that growth prediction is preferred, the method 300 moves to block 425. At block 425, the computing system predicts the pet's growth within a defined timeframe (e.g., nine months), and generates corresponding predicted features and parameters. In some embodiments, the computing system may take the current features and parameters as inputs, and predict the growth by applying advanced algorithms (e.g., regression models, CNNs), which are trained on historical datasets that capture the growth patterns of various animals and breeds.

After the prediction is complete, the method 300 proceeds to block 430, where pet mapping (e.g., 315 of FIG. 3) is generated based on these predicted features. In some embodiments, the pet mapping may reflect a predicted future status of the pet. In some embodiments, the pet mapping may provide a visualization of the pet that captures anticipated changes in the pet's size, appearance, behavioral patterns, activity levels, and other relevant characteristics.

Figure 5:
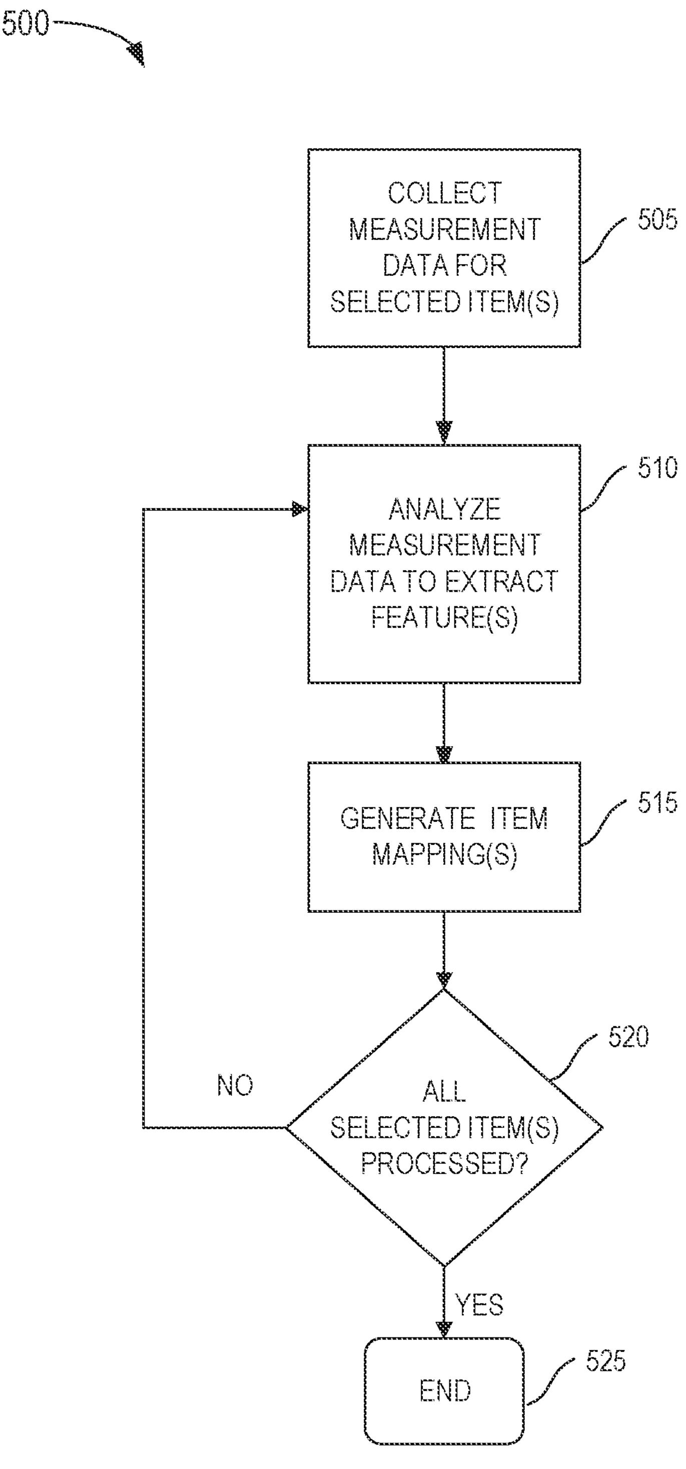
FIG. 5 depicts an example method for item mapping generation, according to some embodiments of the present disclosure.

FIG. 5 depicts an example method 500 for item mapping generation, according to some embodiments of the present disclosure. In some embodiments, the method 500 may be performed by one or more computing devices (e.g., a system that processes visual data and performs inventory searches), such as the server 120 as illustrated in FIG. 1, the feature extraction component 215 and/or the mapping generation component 240 as illustrated in FIG. 2, and the computing device 800 as illustrated in FIG. 8.

At block 505, a computing system (e.g., 120 of FIG. 1) collects measurement data for the pet-related item(s) selected by an end user or customer. When more than one item is selected by the customer, detailed measurement data may be obtained for each selected item. In some embodiments, the measurement data for each selected item may be retrieved from a remote database (e.g., 125 of FIG. 1), which stores details such as dimensions, sizes, colors, weight, materials, price, availability, brand, and other relevant attributes of various pet-related items. The measurement data may include numeric data (e.g., dimensions, sizes, weights) and textual data (e.g., descriptions, reviews). In some embodiments, the measurement data may include visual representations, such as images, for each selected pet-related item.

At block 510, the computing system analyzes the measurement data to extract features for each selected item. In some embodiments, such as when the measurement data includes textual or numeric data, the system may utilize various natural language processing (NLP) techniques to interpret the data and extract features. In some embodiments, such as when the measurement data includes visual representations, such as images, for the selected item(s), the computing system may apply trained ML models (e.g., CNNs) to process the visual data and identify relevant item features. When multiple items are selected by the customer for one pet, the computing system may perform feature extraction sequentially (e.g., processing one item after the next) or in parallel (e.g., analyzing measurement data for multiple items to generate corresponding features simultaneously).

At block 515, the computing system generates mapping(s) (e.g., 320 of FIG. 3) for the selected item(s) based on the features that have been extracted. In some embodiments, such as when multiple items are selected, the system may generate item mappings for each item using one or more computer vision algorithms. The mapping for each item may include a visual representation (e.g., a 2D or 3D model) that displays the item's characteristics in detail.

At block 520, the system checks whether all selected item(s) have been processed (e.g., whether relevant features have been identified and corresponding mapping has been generated). If the system determines there are item(s) still waiting for processing, the method 500 returns to block 510, where the computing system continues the analysis and mapping generation. If the system determines that all selected item(s) have been processed, the method 500 proceeds to block 525, where the item mapping generation process ends.

Figure 6:
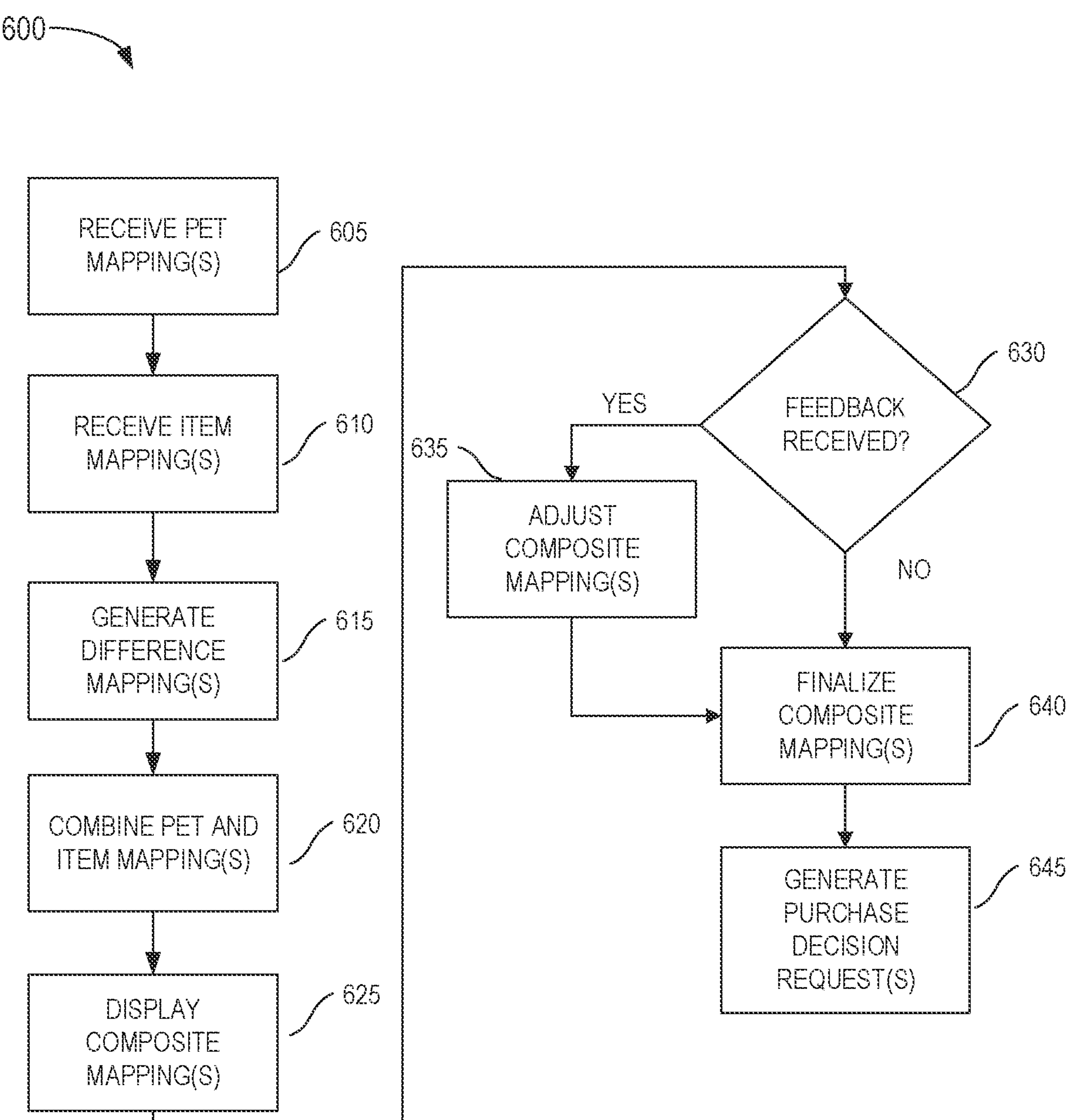
FIG. 6 depicts an example method for composite mapping generation, according to some embodiments of the present disclosure.

FIG. 6 depicts an example method 600 for composite mapping generation, according to some embodiments of the present disclosure. In some embodiments, the method 600 may be performed by one or more computing devices (e.g., a system that processes visual data and performs inventory searches), such as the server 120 as illustrated in FIG. 1, the mapping overlay component 260 as illustrated in FIG. 2, and the computing device 800 as illustrated in FIG. 8.

The method 600 begins at block 605, where a computing system (e.g., 120 of FIG. 1) receives the generated mapping(s) for a pet (e.g., 315 of FIG. 3). As discussed above, the pet mapping(s) may be generated based on features extracted from visual data (e.g., images, videos) provided by an end user or customer. In some embodiments, the pet mapping(s) received at block 605 may include a mapping that reflects or displays the pet's current status, including its current size, shape, weight, height, behavioral traits, activity level, and the like. In some embodiments, the pet mapping(s) received at block 605 may include a mapping that captures the pet's anticipated growth within a defined period of time. In some embodiments, both types of mappings are received, which provide a comprehensive representation that covers both the present attributes and the predicted growth of the pet.

At block 610, the computing system receives item mapping(s) (e.g., 320 of FIG. 3). These item mapping(s) depict the dimensions and characteristics of the pet-related item(s) selected by an end user or customer for the pet. In some embodiments, one or more mappings may be generated for a single selected item to accurately represent the item from different aspects (e.g., a top view, a side view, a front view).

At block 615, the computing system generates a difference mapping (e.g., 325 of FIG. 3) that captures the dimensional differences between the pet and one of the selected items based on their respective individual mappings. In some embodiments, the computing system unifies the scales in the individual mappings, and highlights areas where adjustments are preferred for the pet and/or the item in order to facilitate a realistic and accurate depiction of the pet-item interaction. In some embodiments, the difference mapping may display the discrepancies in size, proportion, and/or orientation between the pet and the selected item. The difference mapping may serve as a guide to ensure that, when the item mapping is superimposed onto the pet mapping, the resulting representation accurately depicts how the item will fit or appear on the pet.

At block 620, the computing system combines the item mapping(s), the pet mappings, and the difference mapping(s) to produce one or more composite mappings. In some embodiments, the system may unify the scales of different individual mappings, and then identify the preferred size modifications (for either the pet, the item, or both) based on the difference mapping (e.g., 325 of FIG. 3). As discussed above, the difference mapping may capture the dimensional differences between the pet and the item in their respective individual mappings, as well as highlight the relevant adjustments to align the pet and the item appropriately for realistic interaction. Relying on the identification, the computing system may adjust the dimensions of the pet or the item (or both), which may involve enlarging, reducing, or reshaping the item or pet representation to ensure they align each other in the correct proportion. Following these adjustments, the computing system may proceed to overlay or superimpose the modified item mapping onto the modified pet mapping. This may involve placing the representation of the item (e.g., 310A of FIG. 3) in the appropriate position relative to the pet (e.g., that a collar is placed around the pet's neck). The resulting composite mapping may provide a visualization that accurately depicts the relationship and interaction between the pet and the item (e.g., 330 of FIG. 3).

As discussed above, in some embodiments, a single item mapping (which depicts a selected item) (e.g., a ball) (and its related difference mapping) may be integrated with (or overlaid onto) a pet mapping that represents the pet's current status (e.g., a 3-month-old golden retriever). The output may include a composite mapping that shows the immediate interactions between the pet and the selected item (e.g., the 3-month-old golden retriever playing with the ball). In some embodiments, a single item mapping (which depicts a selected item) (e.g., a ball) (and its related difference mapping) may be integrated with (or overlaid onto) a pet mapping that reflects the pet's anticipated growth within a defined period of time (e.g., a transition from a 3-month-old to a 6-month-old golden retriever). This may create a composite mapping that depicts the potential interactions between the pet and the item as the pet matures or experiences anticipated changes (e.g., how the 3-month-old golden retriever might play with the ball as it grows to 6 months old). In some embodiments, when multiple items are selected for one pet and multiple item mappings are generated (with each corresponding to a selected item), the computing system may integrate these multiple item mappings (and their related difference mappings) into a singular pet mapping. The output is a composite mapping that depicts the pet's fit and/or interactions with multiple items.

At block 625, the computing system displays the composite mapping to end users or customers on AR-enabled devices. In some embodiments, the AR-enabled devices (e.g., AR headset 155 of FIG. 1) may include any AR display device, such as AR headsets, AR glasses, or other specialized AR viewing tools. In some embodiments, after users have viewed the composite mappings, the computing system may generate requests (e.g., displayed on the AR devices or the check-in kiosk), asking the customers to provide their observations, feedback, and suggestions regarding the visual representations. In some embodiments, the feedback may include minor adjustments in the positioning or size of the item or the pet on the composite mappings. In some embodiments, the feedback may include visual discrepancies the customers observed.

At block 630, the computing system determines if any feedback is received regarding the composite mappings. If feedback is present, the method 600 proceeds to block 635, where the computing system adjusts the composite mappings based on the received feedback. If no feedback is received, the method 600 proceeds to block 640. At block 535, the computing system finalizes the composite mappings. At block 645, the computing system generates requests that encourage customers or end users to make a purchase decision based on the final composite mappings. In some embodiments, the request may appear as a pop-up window on the AR display devices (e.g., 155 of FIG. 1) or the check-in kiosk (e.g., 105 of FIG. 1). The pop-up window may show a request for action to the users (e.g., "Proceed to Purchase"). The pop-up window may also include relevant product details (e.g., available color, size, and pricing), and provide options to further review the products (e.g., "View More Details") and save the products for later consideration. In some embodiments, the purchase request may be displayed on the user's personal device, such as a smart phone or a laptop. In such configurations, a notification and/or an app interface may be used to display the purchase request, which offers users an alternative way to review their selections.

Figure 7:
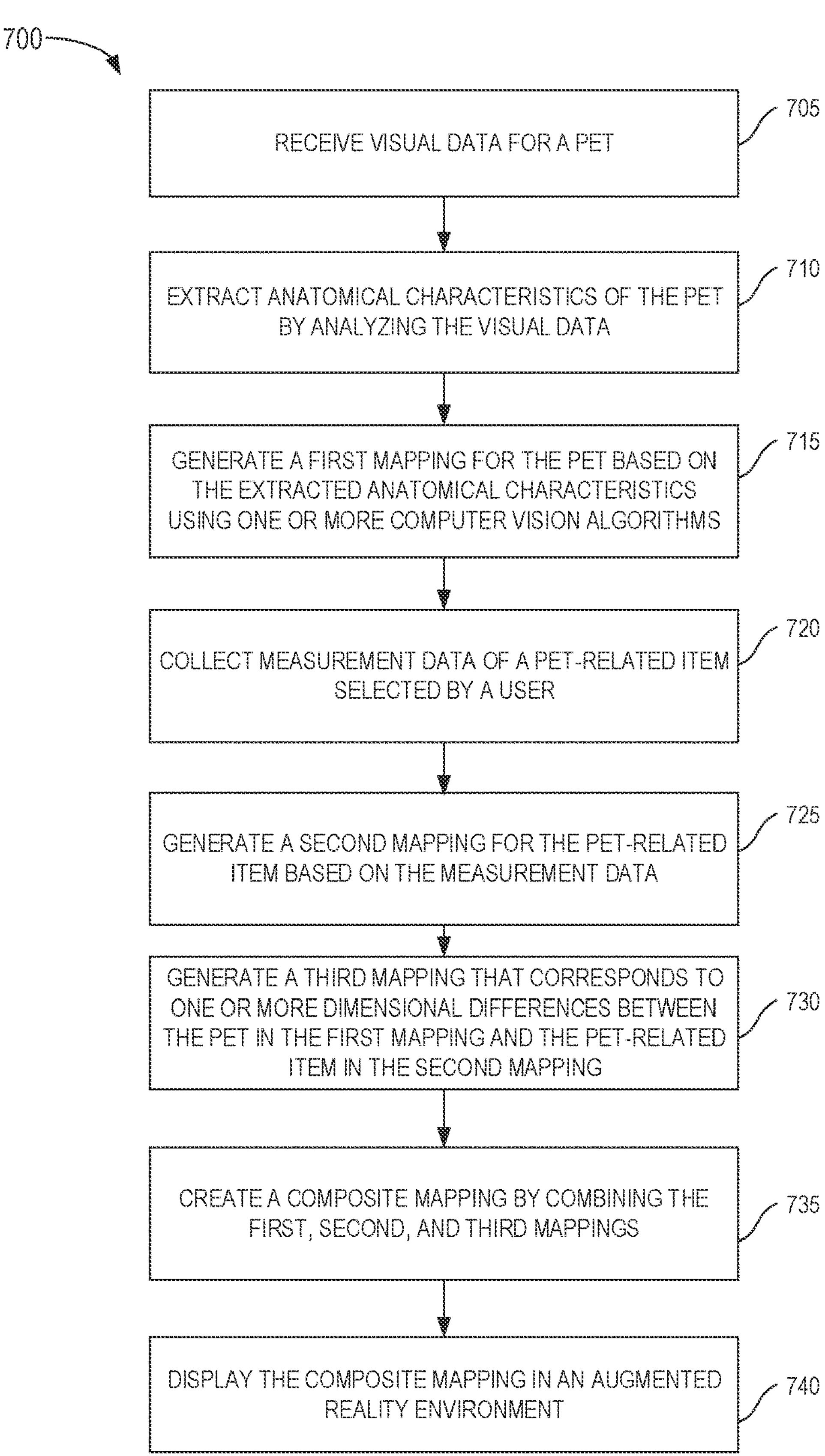
FIG. 7 is a flow diagram depicting an example method for generating individual mappings for pets and selected items and combining the individual mappings to produce composite visual representations, according to some embodiments of the present disclosure.

FIG. 7 is a flow diagram depicting an example method 700 for generating individual mappings for pets and selected items and combining the individual mappings to produce composite visual representations, according to some embodiments of the present disclosure.

At block 705, a computing system (e.g., 120 of FIG. 1) receives visual data (e.g., 205 of FIG. 2) of a pet. In some embodiments, the visual data may comprise at least one of a video or an image of the pet.

At block 710, the computing system extracts features (e.g., 220 of FIG. 2) of the pet by analyzing the visual data (e.g., 205 of FIG. 2). In some embodiments, the features of the pet may comprise at least one of (i) physical attributes of the pet; (ii) behavioral patterns of the pet; or (iii) anatomical movements of the pet. In some embodiments, a convolutional neural network may be trained to process the visual data to extract the features.

At block 715, the computing system generates a first mapping (e.g., 245 of FIG. 2) for the pet based on the extracted features using one or more computer vision algorithms.

At block 720, the computing system collects measurement data (e.g., 210 of FIG. 2) of a pet-related item selected by a user.

At block 725, the computing system generates a second mapping (e.g., 250 of FIG. 2) for the pet-related item based on the measurement data.

At block 730, the computing system generates a third mapping (e.g., 255 of FIG. 2) that corresponds to one or more dimensional differences between the pet in the first mapping and the pet-related item in the second mapping At block 735, the computing system creates a composite mapping (e.g., 265 of FIG. 2) by combining the first, second and third mappings. In some embodiments, the composite mapping may comprise at least one of (i) a two-dimensional representation or (ii) a three-dimensional representation that depicts interactions of the pet with the pet-related item. In some embodiments, when creating the composite mapping, the computing system may identify the one or more dimensional differences between the pet in the first mapping and the pet-related item in the second mapping based on the third mapping, adjust sizes of at least one of (i) the pet in the first mapping, or (ii) the pet-related item in the second mapping, and integrate the adjusted sizes into the composite mapping to provide a scaled representation.

At block 740, the computing system displays the composite mapping in an augmented reality environment. In some embodiments, the computing system may further generate a request to facilitate a purchase decision for the pet-related item (as depicted at block 645 of FIG. 6). In some embodiments, the computing system may further receive feedback from the user when the composite mapping is being displayed (as depicted at block 630 of FIG. 6), and dynamically adjust the composite mapping based on the feedback (as depicted at block 635 of FIG. 6).

In some embodiments, the computing system may further predict changes in the extracted features of the pet (e.g., 235 of FIG. 2) after a predetermined period of time, generate a fourth mapping for the pet based on the predicted changes, generate a fifth mapping that corresponds to one or more dimensional differences between the pet in the fourth mapping and the pet-related item in the second mapping, create a second composite mapping by combining the second, fourth, and fifth mappings, and display the second composite mapping in the augmented reality environment. In some embodiments, the computing system may further receive textual data of the pet, and extract the features of the pet by analyzing the textual data, wherein the textual data comprises at least one of (i) descriptive statements about the pet; or (ii) one or more metrics related to the pet.

FIG. 8 depicts an example computing device 800 for mapping generation and composition, according to some embodiments of the present disclosure. Although depicted as a physical device, in some embodiments, the computing device 800 may be implemented using virtual device(s), and/or across a number of devices (e.g., in a cloud environment). The computing device 800 can be embodied as any computing device, such as the server 120, the end user device 115, and the AR headset 155 as illustrated in FIG. 1.

As illustrated, the computing device 800 includes a CPU 805, memory 810, storage 815, one or more network interfaces 825, and one or more I/O interfaces 820. In the illustrated embodiment, the CPU 805 retrieves and executes programming instructions stored in memory 810, as well as stores and retrieves application data residing in storage 815. The CPU 805 is generally representative of a single CPU and/or GPU, multiple CPUs and/or GPUs, a single CPU and/or GPU having multiple processing cores, and the like. The memory 810 is generally included being representative of a random access memory. Storage 815 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 835 (such as keyboards, monitors, etc.) are connected via the I/O interface(s) 820. Further, via the network interface 825, the computing device 800 can be communicatively coupled with one or more other devices and components (e.g., via a network, which may include the Internet, local network(s), and the like). As illustrated, the CPU 805, memory 810, storage 815, network interface(s) 825, and I/O interface(s) 820 are communicatively coupled by one or more buses 830.

In the illustrated embodiment, the memory 810 includes a feature extraction component 850, a mapping generation component 855, a mapping overlay component 860, and an AR display component 865. Although depicted as a discrete component for conceptual clarity, in some embodiments, the operations of the depicted component (and others not illustrated) may be combined or distributed across any number of components. Further, although depicted as software residing in memory 810, in some embodiments, the operations of the depicted components (and others not illustrated) may be implemented using hardware, software, or a combination of hardware and software.

In the illustrated embodiment, the feature extraction component 850 may be configured to extract features by processing various data. The data may include visual data (e.g., images or videos) (e.g., 205 of FIG. 2) of a pet and measurement data (e.g., 210 of FIG. 2) of pet-related items selected by a user for the pet. In some embodiments, the feature extraction component 850 may extract relevant pet features from the visual data. In some embodiments, the feature extraction component 850 may extract features of the items from their corresponding measurement data. In some embodiments, trained ML models (e.g., CNNs) may be deployed to process the data (e.g., visual data of the pet, measurement data of the selected items) to identify the relevant features. In some embodiments, the measurement data may include various forms, such as images, videos, textual descriptions, and specifications. In some embodiments, the measurement data for a selected item may depict different characteristics of the item, such as its dimension, size, color, weight, material, price, availability, brand, and other relevant attributes.

In the illustrated example, the mapping generation component 855 may create detailed mappings based on the extracted features. For example, in some embodiments, the mapping generation component 855 may generate a detailed mapping for the pet based on the features extracted from the pet's related visual data. In some embodiments, based on the features extracted from the item's measurement data, the mapping generation component 855 may generate a detailed mapping for the selected pet-related item.

Various computer vision algorithms or techniques may be used in constructing the mappings, such as CNNs (for generating 2D images from extracted parameters), 3D reconstruction (for generating 3D structures from 3D images), texture mapping (to add a realistic texture to the 3D models) (e.g., applying fur textures to a pet model), and shader programming (to adjust the lighting and shading of the model to make it consistent with the real-world environment). In some embodiments, such as when the pet mapping and the item mapping operate on different scales, the item in the item mapping may appear disproportionally smaller or larger than the pet. In such configurations, the mapping generation component 855 may generate a difference mapping that captures the dimensional discrepancies and shows the size adjustments preferred for either the pet or the item to achieve a unified scale.

In the illustrated example, the mapping overlay component 860 may generate one or more composite mappings by combining the item mappings, pet mapping, and their related difference mappings. In some embodiments, the integration of the difference mappings may ensure that the pet and the item representations in the composite mapping align accurately and in the correct proportion to each other. In some embodiments, the mapping overlay component 860 may simulate interactions based on the inherent characteristics of the pet and the items. For example, a collar would be visualized around the pet's neck, while a toy may be depicted as being carried in the pet's month. Through such simulations, the composite mapping may offer a visual representation illustrating how the pet might interact with, use, or wear the selected items.

In the illustrated example, the AR display component 865 may be configured to display the composite mapping to users in an AR environment. In some embodiments, the AR display component 865 may transmit the composite mapping to a user device (e.g., an AR headset, an AR glass, or other AR viewing tools), and the component 865 may adjust the composite mapping based on the specification of the user device.

In the illustrated example, the storage 815 may include visual data for pets 870 received from various customers, measurement data for different pet-related items 875, historical mapping data 880, growth prediction algorithms 885, and trained feature extraction models 890. In some embodiments, the aforementioned data may be saved in a remote database (e.g., 125 of FIG. 1) that connects to the computing device 800 via a network.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to the described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not an advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the “C” programming language or similar programming languages. The computer readable program instructions may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in “the cloud,” without regard for the underlying physical systems (or locations of those systems) used to provide the computing resources.

Typically, cloud computing resources are provided to a user on a pay-per-use basis, where users are charged for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., pet supply simulation application) or related data available in the cloud. For example, the pet supply simulation application could that performs the mapping generation and integration through a cloud computing infrastructure, and store the relevant data in a storage location in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A method comprising:

receiving visual data of a pet;

extracting features of the pet by analyzing the visual data;

generating predicted features of the pet, using a machine learning (ML) model, based on the extracted features, the predicted features representing predicted changes in one or more physical attributes and behavioral tendencies of the pet over a defined period of time;

generating a first mapping for the pet based on the predicted features using one or more computer vision algorithms;

collecting measurement data of a pet-related item selected by a user;

generating a second mapping for the pet-related item based on the measurement data;

generating a composite mapping by overlaying the second mapping on top of the first mapping;

generating a visual representation of the composite mapping;

causing the visual representation to display in an augmented reality environment;

determining that a dimensional difference between the predicted features of the pet in the first mapping and the measurement data of the pet-related item in the second mapping is present in the visual representation of the composite mapping;

responsive to determining the dimensional difference is present in the visual representation:

automatically adjusting the predicted features of the pet in the first mapping and the measurement data of the pet-related item in the second mapping to a unified scale, integrating the adjusted predicted features and adjusted measurement data into the composite mapping, and generating a second visual representation of the composite mapping comprising the integrated adjusted predicted features and adjusted measurement data; and causing the second visual representation of the composite mapping to display in the augmented reality environment.

2. The method of claim 1, wherein the visual data comprises at least one of a video or an image of the pet.

3. The method of claim 1, wherein the composite mapping comprises at least one of (i) a two-dimensional representation or (ii) a three-dimensional representation that depicts interactions of the pet with the pet-related item.

4. The method of claim 1, wherein creating the composite mapping comprises:

identifying the dimensional difference between the pet in the first mapping over a predetermined period of time and the pet-related item in the second mapping based on a third mapping;

adjusting sizes of at least one of (i) the pet in the first mapping, wherein the sizes are associated with the predetermined period of time, or (ii) the pet-related item in the second mapping; and integrating the adjusted sizes into the composite mapping to provide a scaled representation.

5. The method of claim 1, further comprising generating a request to facilitate a purchase decision for the pet-related item.

6. The method of claim 1, wherein the extracted features of the pet comprise at least one of (i) physical attributes of the pet; (ii) behavioral patterns of the pet; or (iii) anatomical movements of the pet.

7. The method of claim 1, further comprising:

receiving feedback from the user when the composite mapping is being displayed; and dynamically adjusting the composite mapping based on the feedback.

8. The method of claim 1, wherein a convolutional neural network is trained to process the visual data to extract the features.

9. The method of claim 1, further comprising:

receiving textual data of the pet, and extracting the features of the pet by analyzing the textual data, wherein the textual data comprises at least one of (i) descriptive statements about the pet; or (ii) one or more metrics related to the pet.

10. A system comprising:

one or more memories collectively storing computer-executable instructions; and one or more processors configured to collectively execute the computer-executable instructions and cause the system to:

receive visual data of a pet;

extract features of the pet by analyzing the visual data;

generate predicted features of the pet, using a machine learning (ML) model, based on the extracted features, the predicted features representing predicted changes in one or more physical attributes and behavioral tendencies of the pet over a defined period of time;

generate a first mapping for the pet based on the predicted features using one or more computer vision algorithms;

collect measurement data of a pet-related item selected by a user;

generate a second mapping for the pet-related item based on the measurement data;

generate a composite mapping by overlaying the second mapping on top of the first mapping;

generate a visual representation of the composite mapping;

cause the visual representation to display in an augmented reality environment;

determine that a dimensional difference between the predicted features of the pet in the first mapping and the measurement data of the pet-related item in the second mapping is present in the visual representation of the composite mapping;

responsive to determining the dimensional difference is present in the visual representation:

automatically adjust the predicted features of the pet in the first mapping and the measurement data of the pet-related item in the second mapping to a unified scale, integrate the adjusted predicted features and adjusted measurement data into the composite mapping, and generate a second visual representation of the composite mapping comprising the integrated adjusted predicted features and adjusted measurement data; and cause the second visual representation of the composite mapping to display in the augmented reality environment.

11. The system of claim 10, wherein the visual data comprises at least one of a video or an image of the pet.

12. The system of claim 10, wherein the composite mapping comprises at least one of (i) a two-dimensional representation or (ii) a three-dimensional representation that depicts interactions of the pet with the pet-related item.

13. The system of claim 10, wherein, to create the composite mapping, the one or more processors configured to collectively execute the computer-executable instructions and cause the system to:

identify the one or more dimensional differences between the pet in the first mapping over a predetermined period of time and the pet-related item in the second mapping based on a third mapping;

adjust sizes of at least one of (i) the pet in the first mapping, wherein the sizes are associated with the predetermined period of time, or (ii) the pet-related item in the second mapping; and integrate the adjusted sizes into the composite mapping to provide a scaled representation.

14. The system of claim 10, wherein the one or more processors configured to collectively execute the computer-executable instructions and cause the system to further generate a request to facilitate a purchase decision for the pet-related item.

15. The system of claim 10, wherein the extracted features of the pet comprise at least one of (i) physical attributes of the pet; (ii) behavioral patterns of the pet; or (iii) anatomical movements of the pet.

16. The system of claim 10, wherein the one or more processors configured to collectively execute the computer-executable instructions and cause the system to further:

receive feedback from the user when the composite mapping is being displayed; and dynamically adjust the composite mapping based on the feedback.

17. The system of claim 10, wherein a convolutional neural network is trained to process the visual data to extract the features.

18. A computer program product, comprising:

a computer-readable storage medium having computer-readable program code executable to cause the computer program product to:

receive visual data of a pet;

extract features of the pet by analyzing the visual data;

generate predicted features of the pet, using a machine learning (ML) model, based on the extracted features, the predicted features representing predicted changes in one or more physical attributes and behavioral tendencies of the pet over a defined period of time;

generate a first mapping for the pet based on the predicted features using one or more computer vision algorithms;

collect measurement data of a pet-related item selected by a user;

generate a second mapping for the pet-related item based on the measurement data;

generate a composite mapping by overlaying the second mapping on top of the first mapping;

generate a visual representation of the composite mapping;

cause the visual representation to display in an augmented reality environment;

determine that a dimensional difference between the predicted features of the pet in the first mapping and the measurement data of the pet-related item in the second mapping is present in the visual representation of the composite mapping;

responsive to determining the dimensional difference is present in the visual representation:

automatically adjust the predicted features of the pet in the first mapping and the measurement data of the pet-related item in the second mapping to a unified scale, integrate the adjusted predicted features and adjusted measurement data into the composite mapping, and generate a second visual representation of the composite mapping comprising the integrated adjusted predicted features and adjusted measurement data; and cause the second visual representation of the composite mapping to display in the augmented reality environment; and one or more processors, each processor of which is configured to execute at least a respective portion of the computer-readable program code.

* * * * *